United States Patent
Shoji (10) Patent No.: US 9,706,710 B2
(45) Date of Patent: Jul. 18, 2017

(54) GRASS COLLECTOR PREVENTING CLIPPINGS DISCHARGED TO THE OUTSIDE

(71) Applicant: KUBOTA CORPORATION, Osaka (JP)

(72) Inventor: Yusuke Shoji, Osaka (JP)

(73) Assignee: KUBOTA KORPORATION, Osaka (JP)

( * ) Notice: Subject to any disclaimer, the term of this patent is extended or adjusted under 35 U.S.C. 154(b) by 0 days.

(21) Appl. No.: 14/633,587

(22) Filed: Feb. 27, 2015

(65) Prior Publication Data

US 2016/0249531 A1   Sep. 1, 2016

(51) Int. Cl.
*A01D 43/00*  (2006.01)
*A01D 43/06*  (2006.01)
*A01D 43/063* (2006.01)

(52) U.S. Cl.
CPC .................. *A01D 43/063* (2013.01)

(58) Field of Classification Search
CPC ...... A01D 43/063; A01D 43/06; A01D 43/07; A01D 2101/00; A01D 43/0636; A01D 43/0635
USPC ..... 56/202, 16.6, 194, 320.2; 15/340.1, 347, 15/353
See application file for complete search history.

(56) References Cited

U.S. PATENT DOCUMENTS

| | | | | |
|---|---|---|---|---|
| 3,517,493 A | * | 6/1970 | Kiteley | A01D 43/063 56/194 |
| 3,624,989 A | * | 12/1971 | Rhodes | A01D 43/063 15/347 |
| 3,722,192 A | * | 3/1973 | Corbett | A01D 43/0636 56/202 |
| 3,971,198 A | * | 7/1976 | Lane | A01D 43/063 56/16.6 |
| 3,974,631 A | * | 8/1976 | Rhodes | A01D 43/063 56/202 |
| 4,095,398 A | * | 6/1978 | Aumann | A01D 43/063 15/340.1 |
| 4,158,280 A | * | 6/1979 | Thomas | A01D 43/06 56/16.6 |
| 4,173,111 A | * | 11/1979 | Peterson | A01D 43/063 56/202 |
| 4,310,998 A | * | 1/1982 | Cuba | A01D 43/07 15/340.1 |
| 4,426,830 A | * | 1/1984 | Tackett | A01D 43/077 56/16.6 |
| 4,532,755 A | * | 8/1985 | Schemelin | A01D 43/063 56/16.6 |

(Continued)

FOREIGN PATENT DOCUMENTS

JP         2003310025 A  * 11/2003  ............ A01D 34/63

*Primary Examiner* — Árpád Fábián-Kovács
(74) *Attorney, Agent, or Firm* — Greenblum & Bernstein, P.L.C.

(57) ABSTRACT

A grass collector is provided with a grass collector body which includes a storage space for storing grass clippings formed inside the grass collector body and a communication air passage having a first end connected to a rear part of the storage space to allow the storage space and the outside to communicate with each other; a duct which has a first end connected to a front part of the grass collector body and guides grass clippings to the grass collector body; and a dustproof net provided in the communication air passage.

21 Claims, 8 Drawing Sheets

(56) References Cited

U.S. PATENT DOCUMENTS

| | | | | |
|---|---|---|---|---|
| 4,665,684 | A * | 5/1987 | DiPaolo | A01D 43/063 56/16.6 |
| 4,745,735 | A * | 5/1988 | Katayama | A01D 43/063 56/202 |
| 4,819,417 | A * | 4/1989 | Bryant | A01D 43/077 56/16.6 |
| 4,924,664 | A * | 5/1990 | Hicks | A01D 43/063 56/16.6 |
| 4,969,320 | A * | 11/1990 | Langford | A01D 43/063 141/95 |
| 5,195,310 | A * | 3/1993 | Kettler | A01D 43/0636 56/202 |
| 5,409,512 | A * | 4/1995 | Wilkerson | B01D 46/0068 15/340.1 |
| 5,630,247 | A * | 5/1997 | Venia | A01G 1/125 15/340.1 |
| 5,771,532 | A * | 6/1998 | Munnoch | A47L 11/24 15/347 |
| 5,778,648 | A * | 7/1998 | Parkes | A01D 43/077 56/13.3 |
| 6,038,843 | A | 3/2000 | Sebben et al. | |
| 6,089,006 | A * | 7/2000 | Langford | A01D 43/0631 56/13.3 |
| 6,105,350 | A * | 8/2000 | Vachon | A01D 43/077 56/16.6 |
| 6,183,527 | B1 * | 2/2001 | O'Banion | A47L 5/365 15/347 |
| 6,658,833 | B2 * | 12/2003 | Dunning | A01G 1/125 56/16.6 |
| 6,742,219 | B2 * | 6/2004 | Lenzmeier | E01H 1/0863 15/340.1 |
| 7,194,850 | B2 * | 3/2007 | Asahara | A01D 43/063 56/202 |
| 7,323,022 | B1 * | 1/2008 | Redlin | A01D 43/077 15/340.1 |
| 7,594,378 | B2 * | 9/2009 | Asahara | A01D 43/063 56/194 |
| 7,736,422 | B2 * | 6/2010 | Osborne | B01D 45/16 55/337 |
| 2005/0284120 | A1 * | 12/2005 | Tada | A01D 43/0635 56/202 |
| 2005/0284121 | A1 * | 12/2005 | Iida | A01D 43/063 56/202 |
| 2007/0119138 | A1 * | 5/2007 | Burcham | A01D 43/063 56/202 |
| 2009/0229234 | A1 * | 9/2009 | Ettrich | E01H 1/0863 56/13.1 |
| 2009/0260339 | A1 * | 10/2009 | Uemura | A01D 43/0635 56/202 |
| 2011/0023434 | A1 * | 2/2011 | Sadler | A01D 43/063 56/16.6 |

* cited by examiner

GRASS COLLECTOR PREVENTING CLIPPINGS DISCHARGED TO THE OUTSIDE

TECHNICAL FIELD

The disclosure relates to a grass collector provided in a grass cutter.

BACKGROUND ART

U.S. Pat. No. 6,038,843 discloses a grass cutter (lawn cutter) provided with a mower deck in which blades are disposed and a grass collector which is coupled to the mower deck. Grass (lawn) clippings cut by the blades are conveyed to the grass collector by carrier air generated by the blades.

In a conventional grass cutter, a part of the grass collector is formed in a net-like form. Carrier air is discharged to the outside through the net-like part. Thus, the flow of carrier air is not obstructed. Therefore, it is possible to ensure a grass collecting performance.

However, in the conventional grass cutter, the discharge of carrier air may be obstructed, for example, by the net-like part clogged with grass clippings. The obstruction of the discharge of carrier air deteriorates a grass collecting performance.

In view of this, an opening for discharging carrier air may be formed on the grass collector in addition to the net-like part. However, grass clippings may also be disadvantageously discharged through the formed opening.

SUMMARY OF INVENTION

The object of the disclosure is to provide a grass collector capable of discharging carrier air to the outside and also preventing grass clippings from being discharged to the outside.

One aspect of the disclosure provides a grass collector provided with: a grass collector body, the grass collector body including a storage space for storing grass clippings formed inside the grass collector body and a communication air passage having a first end connected to a rear part of the storage space to allow the storage space and the outside to communicate with each other; a duct having a first end connected to a front part of the grass collector body and guiding grass clippings to the grass collector body; and a dustproof net provided in the communication air passage.

This configuration makes it possible to discharge carrier air to the outside of the grass collector and also to prevent grass clippings from being discharged to the outside of the grass collector.

According to a preferred embodiment of the grass collector, at least a part of a side face of the grass collector body is formed in a net-like form allowing passage of air, and mesh of the dustproof net is larger than mesh of at least the part of the side face of the grass collector body.

This configuration makes it possible to easily discharge carrier air to the outside of the grass collector.

According to a preferred embodiment of the grass collector, the dustproof net is provided on the first end of the communication air passage.

This configuration makes it possible to prevent grass clippings from entering the communication air passage.

According to a preferred embodiment of the grass collector, the first end of the communication air passage is open downward, and the dustproof net covers the first end of the communication air passage.

This configuration makes it possible to prevent grass clippings from entering the communication air passage.

According to a preferred embodiment of the grass collector, the grass collector is further provided with a guide air passage having a first end connected to a second end of the communication air passage and a second end open to the outside at a position lower than the second end of the communication air passage.

This configuration makes it possible to discharge carrier air to the outside together with dust contained in the carrier air at a position lower than the second end of the communication air passage. Accordingly, it is possible to ensure a grass collecting performance and also prevent dust from flying.

According to a preferred embodiment of the grass collector, the second end of the guide air passage is disposed near a bottom part of the grass collector body.

This configuration makes it possible to discharge carrier air to the outside together with dust contained in the carrier air at a position near the bottom part of the grass collector body. Accordingly, it is possible to ensure a grass collecting performance and also prevent dust from flying.

According to a preferred embodiment of the grass collector, the second end of the guide air passage is open downward.

This configuration makes it possible to discharge carrier air downward to the outside together with dust contained in the carrier air. Accordingly, it is possible to ensure a grass collecting performance and also prevent dust from flying.

According to a preferred embodiment of the grass collector, the guide air passage is formed in a net-like form allowing passage of air.

This configuration makes it possible to actively discharge carrier air to the outside through the mesh. Thus, it is possible to ensure a grass collecting performance. Further, it is possible to prevent dust from flying by guiding the dust to the lower side without discharging the dust through the mesh.

According to a preferred embodiment of the grass collector, the guide air passage extends in an up-down direction along a rear side face of the grass collector body.

This configuration makes it possible to discharge carrier air downward to the outside together with dust contained in the carrier air. Accordingly, it is possible to ensure a grass collecting performance and also prevent dust from flying.

According to a preferred embodiment of the grass collector, the rear side face of the grass collector body and the guide air passage are formed in a net-like form allowing passage of air, and mesh of the dustproof net is larger than mesh of the rear side face of the grass collector body and mesh of the guide air passage.

This configuration makes it possible to actively discharge carrier air to the outside through the mesh. Thus, it is possible to ensure a grass collecting performance. Further, it is possible to prevent dust from flying by guiding the dust to the lower side without discharging the dust through the mesh.

According to a preferred embodiment of the grass collector, the first end of the communication air passage is disposed above the rear part of the storage space and the second end of the communication air passage is disposed on the rear side with respect to the storage space.

This configuration makes it possible to discharge carrier air to the outside together with dust contained in the carrier air from the rear part of the storage space. Accordingly, it is possible to ensure a grass collecting performance.

According to a preferred embodiment of the grass collector, the grass collector is further provided with a guide air passage extending in an up-down direction along a rear side face of the grass collector body, the guide air passage having a first end connected to a second end of the communication air passage and a second end disposed near a bottom part of the grass collector body, the second end of the guide air passage being open downward.

This configuration makes it possible to discharge carrier air downward to the outside together with dust contained in the carrier air at a position near the bottom part of the grass collector body. Accordingly, it is possible to ensure a grass collecting performance and also prevent dust from flying.

According to a preferred embodiment of the grass collector, a second end of the communication air passage is divided into a plurality of parts.

This configuration makes it possible to divide carrier air together with dust contained in the carrier air into a plurality of parts and to discharge the divided parts of carrier air and dust to the outside.

According to a preferred embodiment of the grass collector, the grass collector is further provided with a blocking plate disposed inside the storage space in a manner to face the first end of the duct.

This configuration makes it possible to prevent grass clippings from being discharged to the outside of the grass collector. That is, grass clippings from the duct are caused to collide with the blocking plate so as to be dropped downward, thereby preventing grass clippings from entering the communication air passage. Further, the amount of grass clippings that reach the dustproof net can be reduced. Therefore, it is possible to prevent the mesh of the dustproof net from being clogged with grass clippings.

According to a preferred embodiment of the grass collector, the blocking plate is disposed on the front side with respect to the first end of the communication air passage.

This configuration makes it possible to prevent grass clippings from being discharged to the outside of the grass collector. That is, grass clippings from the duct are caused to collide with the blocking plate so as to be dropped downward, thereby preventing grass clippings from entering the communication air passage.

According to a preferred embodiment of the grass collector, an upper part of the blocking plate is coupled to an upper face of the grass collector body and a lower part of the blocking plate extends downward.

This configuration makes it possible to prevent grass clippings from being discharged to the outside of the grass collector. That is, grass clippings from the duct are caused to collide with the blocking plate so as to be dropped downward, thereby preventing grass clippings from entering the communication air passage.

According to a preferred embodiment of the grass collector, the blocking plate is swingable in a front-rear direction.

This configuration makes it possible, when grass clippings are piled up high inside the grass collector, to allow the blocking plate to swing in the front-rear direction in accordance with the grass clippings. Accordingly, the accumulation of the grass clippings is not obstructed. Further, it is possible to prevent the blocking plate from being damaged.

According to a preferred embodiment of the grass collector, the blocking plate has flexibility.

This configuration makes it possible, when grass clippings are piled up high inside the grass collector, to elastically deform the blocking plate in accordance with the grass clippings. Accordingly, the accumulation of the grass clippings is not obstructed. Further, it is possible to prevent the blocking plate from being damaged.

According to a preferred embodiment of the grass collector, the blocking plate is formed in a curved shape.

This configuration makes it possible to easily drop grass clippings downward. Further, it is possible to reduce obstruction against the flow of carrier air.

According to a preferred embodiment of the grass collector, a right-left width of the blocking plate is larger than a right-left width of the first end of the duct.

This configuration makes it possible to easily allow grass clippings to collide with the blocking plate.

DESCRIPTION OF EMBODIMENT

Hereinbelow, a grass cutter 1 which is an example of a grass cutter according to the disclosure will be described. Description will be made by defining directions indicated by arrows U, D, F, B, L, and R in the drawings as an upward direction, a downward direction, a forward direction, a rearward direction, a leftward direction, and a rightward direction, respectively. In each of the drawings, illustration of a member unnecessary for the description is appropriately omitted.

Figure 1:
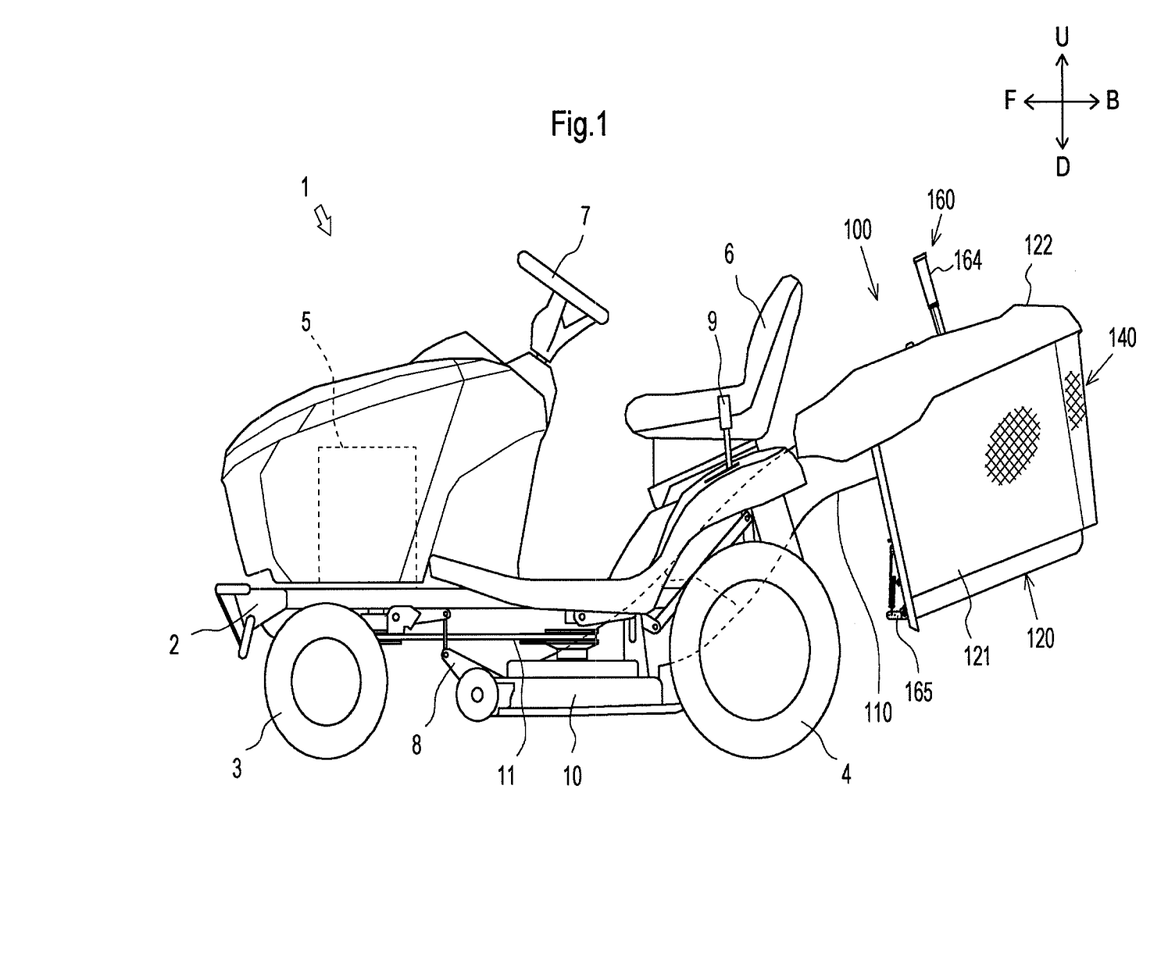
FIG. 1 is a side view illustrating a grass cutter provided with grass collector as an example of the disclosure.
Figure 2:
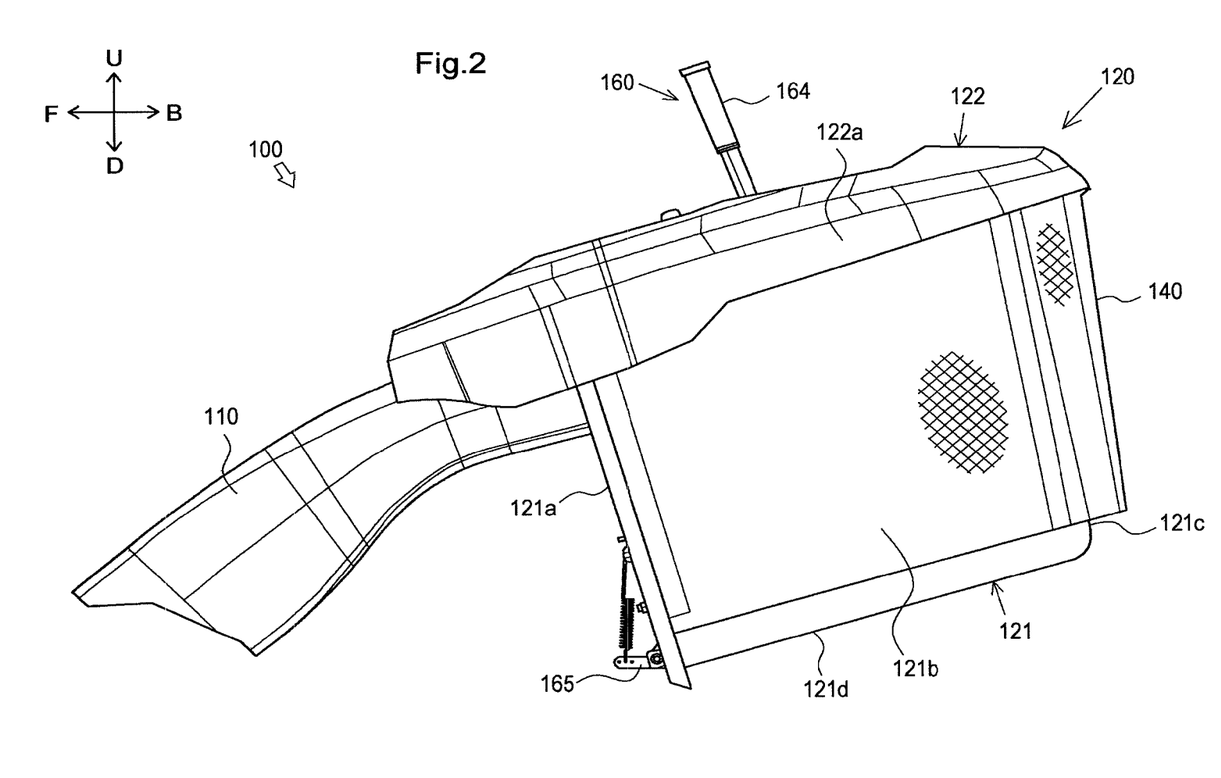
FIG. 2 is a side view illustrating the grass collector as an example of the disclosure.
Figure 3:
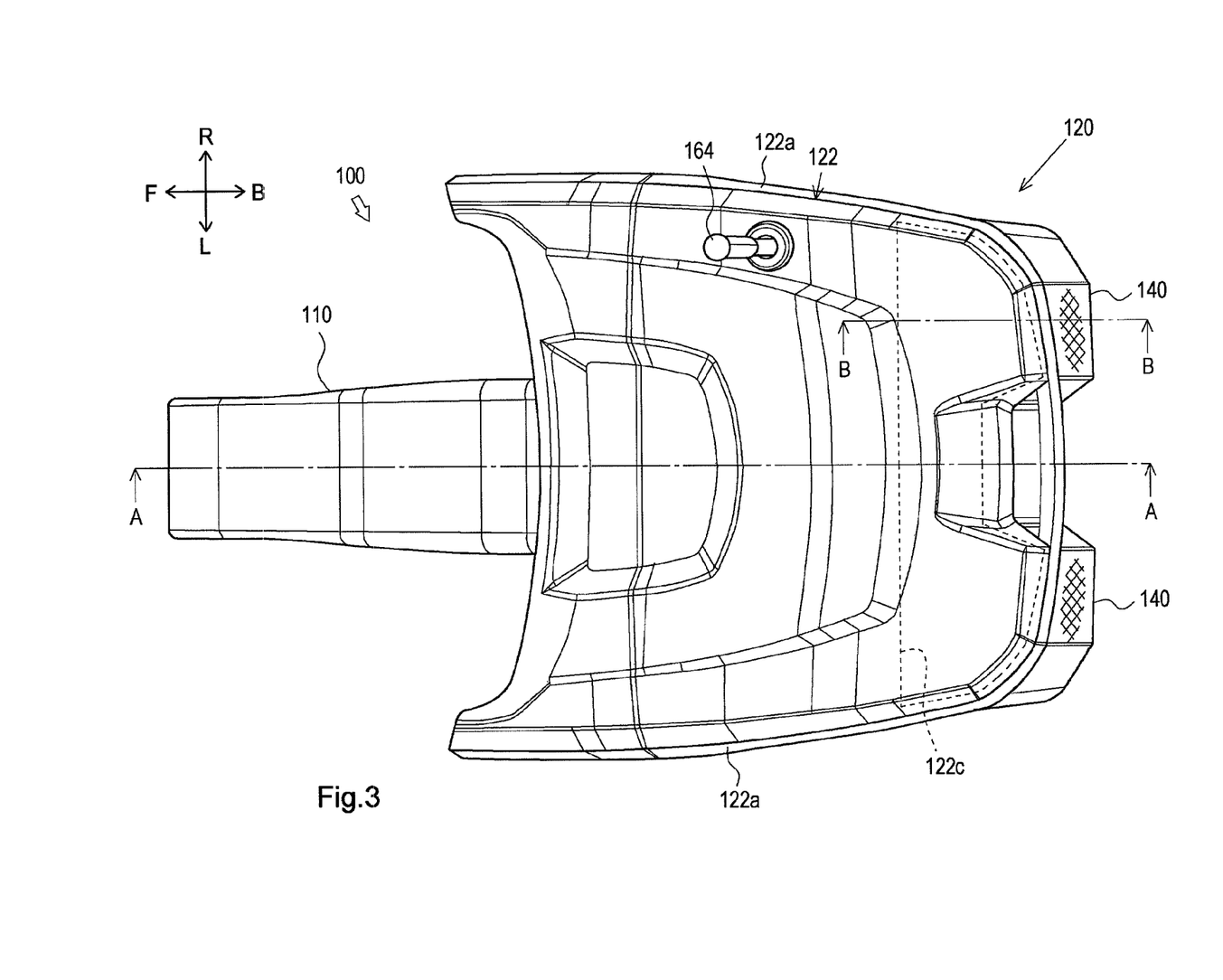
FIG. 3 is a plan view illustrating the grass collector as an example of the disclosure.

First, the entire configuration of the grass cutter 1 will be described with reference to FIG. 1.

The grass cutter 1 is a working vehicle capable of cutting grass (lawn) while traveling. The grass cutter 1 is mainly provided with a traveling machine body 2, a pair of right and left front wheels 3, a pair of right and left rear wheels 4, an engine 5, a driver seat 6, a handle 7, a link mechanism 8, a control lever 9, a mower 10, a power transmission mechanism 20, a duct 30, and a grass collector 40.

The front part of the traveling machine body 2 is supported by the front wheels 3. The rear part of the traveling machine body 2 is supported by the rear wheels 4. The engine 5 is disposed in the front part of the traveling machine body 2. The driver seat 6 on which an operator sits is provided in a front-rear intermediate part of the traveling machine body 2. The handle 7 is provided in front of the driver seat 6.

The link mechanism 8, the mower 10, and the power transmission mechanism 20 are provided under the traveling machine body 2. The control lever 9 is provided beside the driver seat 6. The link mechanism 8 is coupled to the mower 10. The control lever 9 is coupled to the link mechanism 8.

The mower 10 is used for performing a grass-cutting operation using the power of the engine 5. The mower 10 is attached to the traveling machine body 2 through the link mechanism 8. The power transmission mechanism 20 couples the engine 5 and the mower 10 to each other, and transmits the power of the engine 5 to the mower 10. The duct 30 is disposed behind the mower 10 in communication with the mower 10. The grass collector 100 is disposed behind the mower 10 in communication with the mower 10. Blades (not illustrated) are disposed inside the mower 10. Grass clippings cut by the blades of the mower 10 are conveyed rearward by carrier air generated by the blades. Accordingly, the grass clippings are stored inside the grass collector 100.

Next, the configuration of the grass collector 100 will be described with reference to FIGS. 1 to 8. In FIG. 6, an upper cover 122 is not illustrated.

The grass collector 100 stores grass clippings cut by the blades of the mower 10. The grass collector 100 is disposed behind the mower 10. The grass collector 100 is provided with a duct 110, a grass collector body 120, a dustproof net 130, guide air passages 140, a blocking plate 150, and an operation unit 160.

The duct 110 illustrated in FIGS. 1 to 4 and 7 is used for conveying grass clippings cut by the blades of the mower 10 downstream (rearward). The duct 110 is formed in a tubular shape obliquely extending in the upper-rear direction. A carrier path for conveying grass clippings downstream is formed inside the duct 110. The front end of the duct 110 is connected to communicate with the rear part of the mower 10.

The grass collector body 120 illustrated in FIGS. 1 to 8 is used for storing grass clippings. The grass collector body 120 is provided with a storage body 121 and an upper cover 122.

The storage body 121 illustrated in FIGS. 2 and 4 to 8 constitutes a main structure of the grass collector body 120. The storage body 121 is formed in a generally square cylindrical shape having a bottom on the lower end. The storage body 121 is provided with a front side member 121a, right and left side members 121b, 121b, a rear side member 121c, a bottom member 121d, and a storage space 121e.

The front side member 121a illustrated in FIGS. 2, 4, 6 and 7 is a side wall which constitutes the side part on the front side of the storage body 121. The front side member 121a is connected to the rear end of the duct 110. Specifically, an opening is formed on the right-left center near the upper end of the front side member 121a. The rear end of the duct 110 is connected to communicate with the opening. Accordingly, the duct 110 is disposed in such a manner that the rear end of the duct 110 is open rearward.

The right and left side members 121b, 121b illustrated in FIGS. 2 and 4 to 8 are side walls which constitute the side parts on the right and left sides of the storage body 121. The right and left side members 121b, 121b are formed in a net-like form allowing passage of air.

The rear side member 121c illustrated in FIGS. 4 to 7 is a side wall which constitutes the side part on the rear side of the storage body 121. The rear side member 121c is formed in a net-like form allowing passage of air. The size of holes of the mesh of the rear side member 121c is substantially equal to the size of holes of the mesh of the right and left side members 121b, 121b.

The bottom member 121d illustrated in FIGS. 4 to 7 constitutes the bottom part of the storage body 121. The bottom member 121d is fixed to the right and left side members 121b, 121b and the rear side member 121c.

The storage space 121e illustrated in FIGS. 4 to 7 is a space in which grass clippings are stored. Specifically, the storage space 121e is surrounded by the front side member 121a, the right and left side members 121b, 121b, the rear side member 121c, and the bottom member 121d.

The upper cover 122 illustrated in FIGS. 2 to 5 constitutes the upper part of the grass collector body 120. The upper cover 122 is formed in a generally rectangular shape whose right and left ends and rear end are curved downward. The upper cover 122 is disposed to cover the upper part of the storage body 121. The upper cover 122 is provided with right and left side members 122a, 122a, a rib 122b, and a communication air passage 122c.

The right and left side members 122a, 122a illustrated in FIGS. 2 to 5 are side walls which constitute the side parts on the right and left sides of the upper cover 122. The right and left side members 122a, 122a respectively extend downward from the right and left ends of the upper cover 122.

Figure 4:
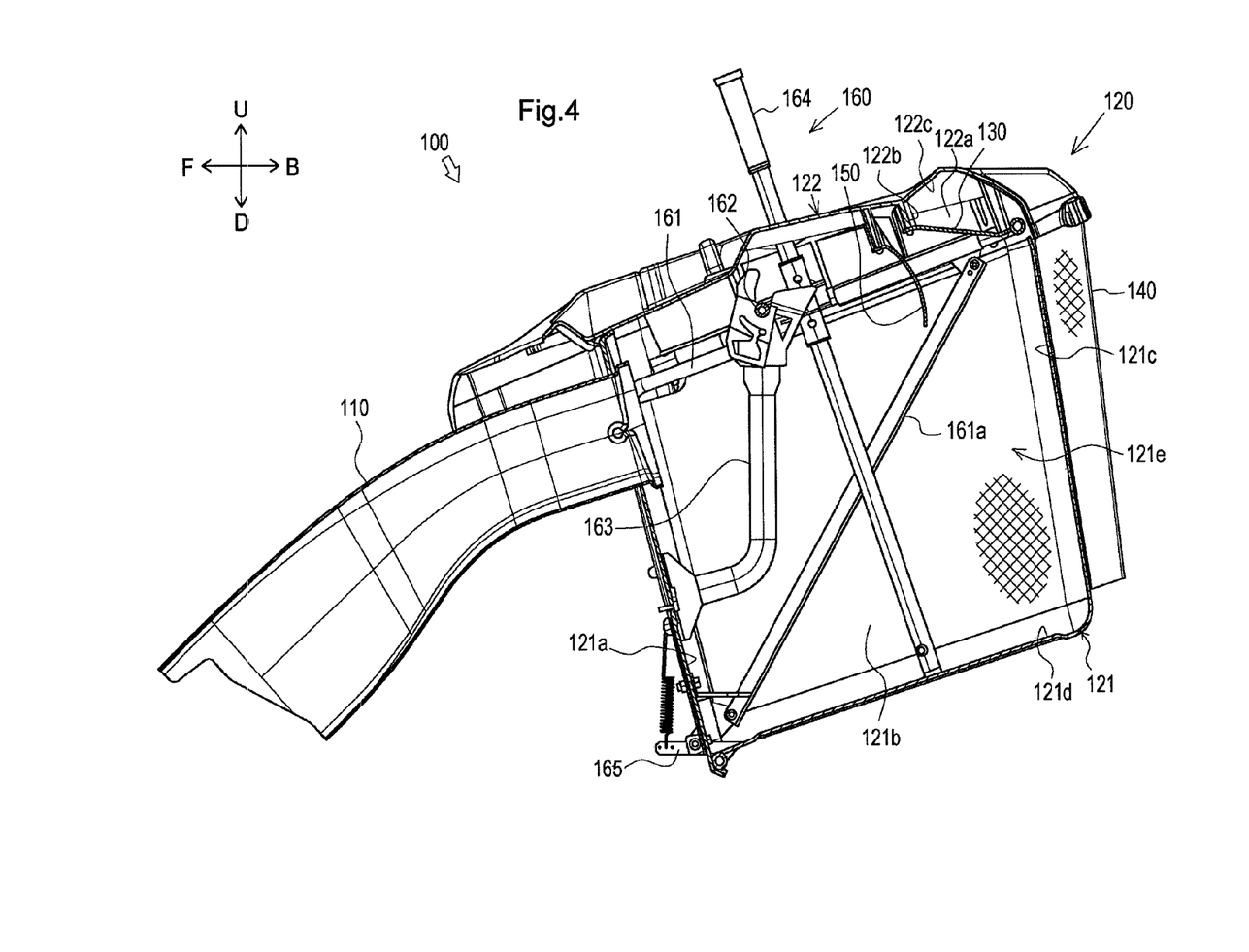
FIG. 4 is a cross-sectional view taken along line A-A in FIG. 3.
Figure 5:
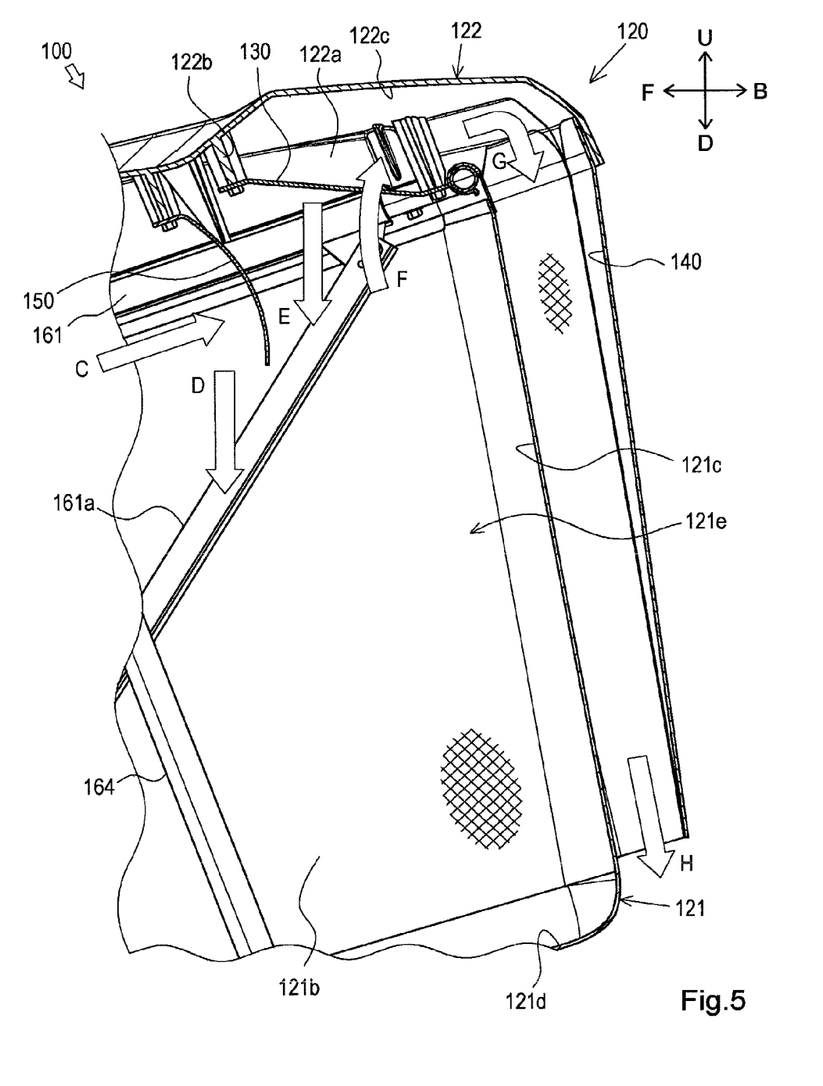
FIG. 5 is a cross-sectional view taken along line B-B in FIG. 3.
Figure 6:
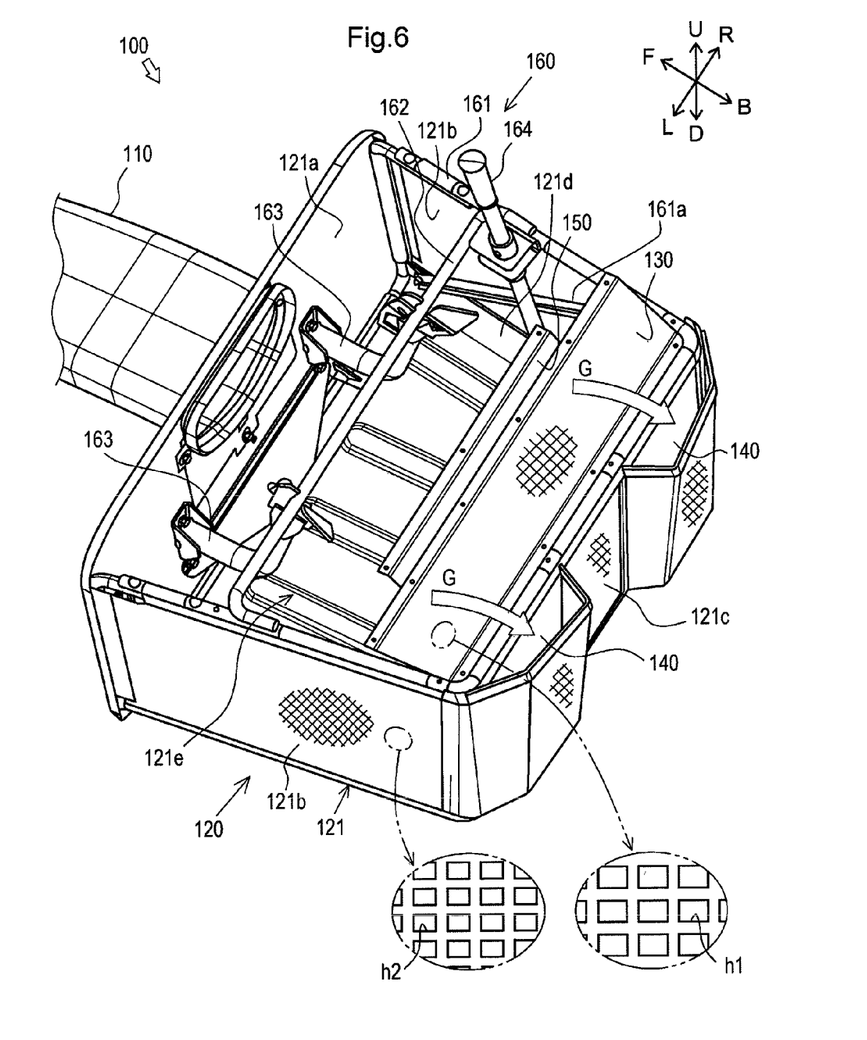
FIG. 6 is an upper perspective view illustrating the inside of a grass collector body.
Figure 7:
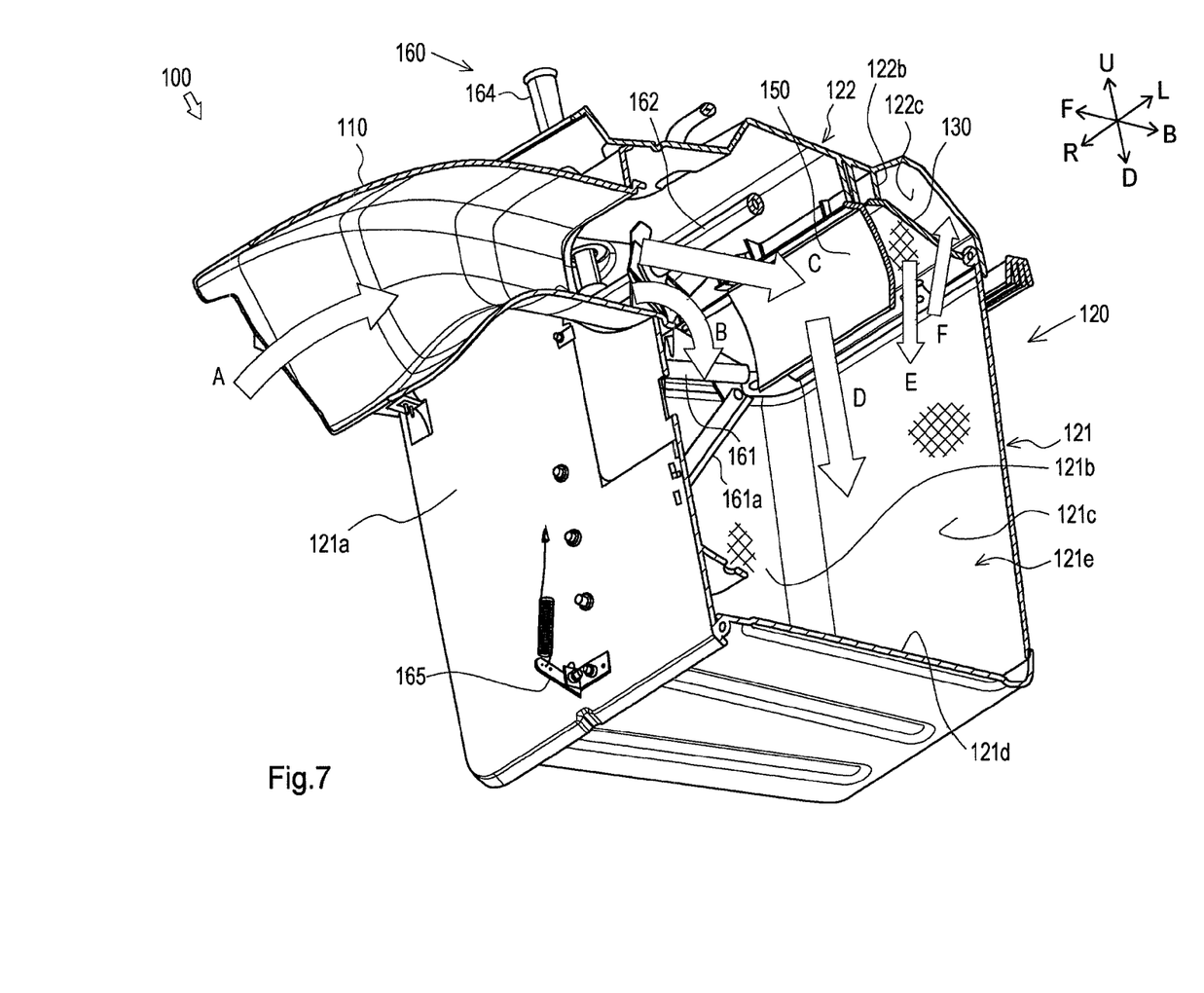
FIG. 7 is a cross-sectional perspective view illustrating the inside of the grass collector body.

The rib 122b illustrated in FIGS. 4, 5 and 7 is a thin-walled member which projects downward from the upper face of the storage body 121. The rib 122b is formed on an intermediate part in the front-rear direction of the upper cover 122 in a manner to connect the right and left side members 122a, 122a to each other.

The communication air passage 122c illustrated in FIGS. 3 to 5 and 7 allows the storage space 121e and the outside of the storage body 121 to communicate with each other. The communication air passage 122c is formed on the rear part of the upper cover 122 (that is, above the rear part of the storage space 121e). The communication air passage 122c is delimited by at least one air-guiding surface extending continuously from an open first end to an open second end, such as the inner face of the upper cover 122. More particularly, the communication air passage 122c is surrounded by the rib 122b on the front end, the inner face of the upper cover 122 on the upper end, and the right and left side members 122a, 122a of the upper cover 122 on the right and left ends. Accordingly, the communication air passage 122c is formed in a box shape whose lower face is open. A front part of the lower face of the communication air passage 122c is open toward the storage space 121e located under the communication air passage 122c. A rear part of the communication air passage 122c is divided into right and left parts. The divided right and left rear parts of the communication air passage 122c are located on the rear side with respect to the rear side part of the storage space 121e. Each of the divided right and left rear parts of the communication air passage 122c is open downward (toward a space outside the storage space 121e).

The dustproof net 130 illustrated in FIGS. 4 to 7 prevents grass clippings from entering the communication air passage 122c and allows carrier air to enter the communication air passage 122c. The dustproof net 130 is formed in a generally rectangular shape. The dustproof net 130 is disposed in such a manner that the rectangular surfaces of the dustproof net 130 face the up and down directions and the longitudinal direction of the dustproof net 130 face the right-left direction. The right and left ends of the dustproof net 130 respectively extend up to the vicinities of the right and left side members 122a, 122a of the upper cover 122 (refer to FIG. 6). The dustproof net 130 is disposed on the lower part of the communication air passage 122c (on the opening which faces the storage space 121e) and covers the opening. The dustproof net 130 is disposed in such a manner that the upper face on the front part of the dustproof net 130 abuts on the lower face of the rib 122b. The dustproof net 130 is fixed to the upper cover 122 from the lower side. The dustproof net 130 is formed in a net-like form allowing passage of air. The size of holes h1 of the mesh of the dustproof net 130 is larger than the size of holes h2 of the mesh of the right and left side members 121b, 121b of the storage body 121 (refer to FIG. 6).

The guide air passages 140 illustrated in FIGS. 5 and 6 guide carrier air flowing through the communication air passage 122c downward together with dust contained in the carrier air. Each of the guide air passages 140 is formed in a tubular shape extending in the up-down direction. The guide air passages 140 are formed on the right and left sides along the rear side member 121c (refer to FIG. 6). The upper ends of the guide air passages 140 respectively communicate with the divided right and left rear parts of the communication air passage 122c. The lower ends of the guide air passages 140 are open downward at positions lower than the rear end of the communication air passage 122c (near the bottom member 121d of the storage body 121). Accordingly, the lower ends of the guide air passages 140 are open to the outside. The side faces of the guide air passages 140 are formed in a net-like form allowing passage of air. The size of holes of the mesh of the guide air passages 140 is substantially equal to the size of the holes h2 of the mesh of the right and left side members 121b, 121b and the mesh of the rear side member 121c.

The blocking plate 150 illustrated in FIGS. 4, 5 and 7 blocks grass clippings from being conveyed rearward. The blocking plate 150 is formed in a generally rectangular shape. The blocking plate 150 is disposed in such a manner that the principal surfaces of the blocking plate 150 face substantially the front and rear directions and the longitudinal direction of the blocking plate 150 faces the right-left direction (refer to FIG. 6). The blocking plate 150 is curved to project rearward. The upper part of the blocking plate 150 is fixed to an intermediate part in the front-rear direction of the upper cover 122 from the lower side. The lower part of the blocking plate 150 extends downward. The blocking plate 150 is disposed on the front side with respect to the communication air passage 122c (between the duct 110 and the communication air passage 122c) to face the rear end (opening) of the duct 110. The blocking plate 150 is formed of a material having flexibility such as rubber. The blocking plate 150 having flexibility can easily swing in the front-rear direction. The width in the right-left direction of the blocking plate 150 is larger than the width in the right-left direction of the rear end of the duct 110.

Figure 8:
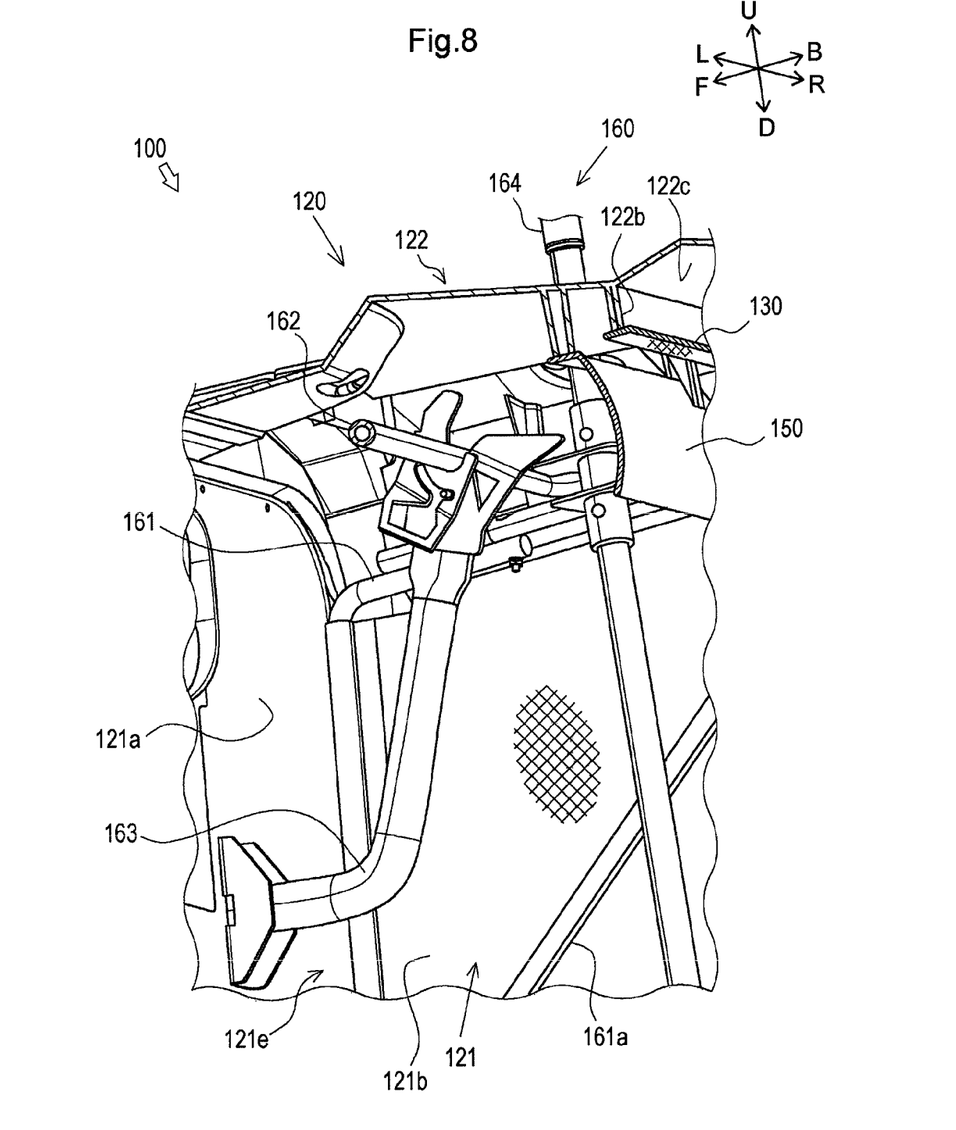
FIG. 8 is a cross-sectional perspective view illustrating an operation unit of the grass collector body.

The operation unit 160 illustrated in FIGS. 4, 6 and 8 is used for operating the grass collector body 120. The operation unit 160 is provided with a grass collector frame 161, a supported member 162, a supporting member 163, an operation lever 164, and the locking member 165.

The grass collector frame 161 supports the storage body 121. The grass collector frame 161 is composed of a pipe which continuously extends through the upper ends of the rear side member 121c and the right and left side members 121b, 121b, the front ends of the right and left side members 121b, 121b, and the front end of the bottom member 121d. The front lower part and the rear upper part of the grass collector frame 161 are connected to each other by a reinforcing member 161a. The supported member 162 is a pipe which extends in the right-left direction in an intermediate part in the front-rear direction of the grass collector frame 161. The right and left ends of the supported member 162 is fixed to the grass collector frame 161.

The supporting member 163 supports the supported member 162. The supporting member 163 is formed in a pipe-like shape which extends rearward and is curved upward on the rear end. The front end of the supporting member 163 is fixed to the front side member 121a of the storage body 121.

The rear end (upper end) of the supporting member 163 supports the supported member 162 from the lower side in a manner to enable the supported member 162 to rotate about the axis of the supported member 162. The operation lever 164 allows the grass collector frame 161 to rotate around the axis of the supported member 162. The locking member 165 locks the front side member 121a and the bottom member 121d so as to prevent the generation of a gap between the front side member 121a and the bottom member 121d.

In order to operate the grass collector body 120, the lock by the locking member 165 is first released. Then, the upper end of the operation lever 164 is operated to move forward (toward the front-lower direction). Accordingly, the grass collector body 120 excepting the front side member 121a rotates around the axis of the supported member 162. As a result, a gap is formed between the front side member 121a and the bottom member 121d. Grass clippings can be discharged to the lower side through the gap.

Hereinbelow, the flow of grass clippings will be described with reference to FIGS. 1 and 4 to 7.

Grass clippings cut by the blades of the mower 10 are conveyed to the duct 110 by carrier air generated by the blades. The grass clippings that have been conveyed to the duct 110 are conveyed rearward along the duct 110 (refer to an arrow A of FIG. 7) by the carrier air. The grass clippings that have been conveyed rearward along the duct 110 are conveyed to the grass collector body 120.

Some of the grass clippings (relatively heavy grass clippings) that have been conveyed to the grass collector body 120 are conveyed to the lower part of the storage space 121e (to the lower-rear direction, refer to an arrow B of FIG. 7) from the rear end of the duct 110. The conveyed grass clippings are accumulated on the lower part of the storage space 121e. On the other hand, the remaining grass clippings (relatively light grass clippings) are conveyed further rearward from the rear end of the duct 110 and collide with the blocking plate 150 (refer to an arrow C of FIGS. 5 and 7). The grass clippings that have collided with the blocking plate 150 are dropped downward (refer to an arrow D of FIGS. 5 and 7) and accumulated on the lower part of the storage space 121e.

The carrier air inside the storage body 121 is discharged to the outside through the right and left side members 121b, 121b and the rear side member 121c of the storage body 121 and discharged to the outside also through the dustproof net 130 having larger holes of the mesh (that is, having coaser mesh) than the right and left side members 121b, 121b. Grass clippings that have not collided with the blocking plate 150 and relatively light grass clippings reach the dustproof net 130 together with the carrier air flowing to the dustproof net 130. The grass clippings that have reached the dustproof net 130 do not pass through the dustproof net 130, but are dropped downward by the dustproof net 130 (refer to an arrow E of FIGS. 5 and 7). On the other hand, the carrier air passes through the dustproof net 130 together with dust contained in the carrier air and enters the communication air passage 122c (refer to an arrow F of FIGS. 5 and 7).

The carrier air that has entered the communication air passage 122c is further conveyed rearward to the guide air passages 140 (refer to arrows G of FIGS. 5 and 6). The carrier air that has been conveyed to the guide air passages 140 is conveyed downward along the guide air passages 140 together with dust contained in the carrier air and then discharged to the outside (refer to an arrow H of FIG. 5).

As described above, in the grass collector 100 according to the present embodiment, grass clippings conveyed from the duct 110 collide with the blocking plate 150 which is disposed on the intermediate part in the front-rear direction of the storage space 121e. In a conventional grass collector which is not provided with the blocking plate 150, most of the grass clippings are conveyed to the rear part of the storage space 121e by carrier air. As a result, the grass clippings are disadvantageously discharged to the outside through, for example, a gap between the storage body 121 and the upper cover 122. Further, more grass clippings are accumulated on the rear part of the storage space 121e than the front part of the storage space 121e.

On the other hand, the grass collector 100 according to the present embodiment enables the amount of grass clippings conveyed to the rear part of the storage space 121e to be reduced by the blocking plate 150. Thus, the amount of grass clippings discharged to the outside from the rear part of the storage body 121 can be reduced. Further, grass clippings can be uniformly stored (accumulated) in the front-rear direction in the storage space 121e. Further, since the amount of grass clippings that reach the dustproof net 130 can be reduced by the blocking plate 150, it is possible to prevent the dustproof net 130 from being clogged with grass clippings.

Further, the dustproof net 130 disposed on the entrance (lower face) of the communication air passage 122c makes it possible to prevent grass clippings that have not been stopped by the blocking plate 150 from entering the communication air passage 122c. The size of the holes h1 of the mesh of the dustproof net 130 is larger than the size of the holes h2 of the mesh of the right and left side members 121b, 121b and the mesh of the rear side member 121c of the storage body 121. Thus, carrier air can be easily guided to the communication air passage 122c.

Further, the guide air passages 140 disposed on the rear end of the communication air passage 122c make it possible to discharge carrier air to the outside from the lower side of the grass collector body 120. Thus, dust contained in the carrier air can also be discharged to the outside from the lower side of the grass collector body 120. Therefore, an operator can be prevented from being covered with dust.

The embodiment of the disclosure has been described above. However, the disclosure is not limited to the above configurations, and various modifications may be made within the scope of the disclosure described in the claims.

For example, although the blocking plate 150 is formed of a material having flexibility such as rubber in the present embodiment, the disclosure is not limited to this configuration. For example, the blocking plate 150 may be made of metal. Although the blocking plate 150 is formed in a generally rectangular shape curved to project rearward (in the upper-rear direction), the disclosure is not limited to this configuration. For example, the blocking plate 150 may be formed in a flat shape.

The upper part of the blocking plate 150 is fixed to the upper cover 122 from the lower side in the present embodiment. However, the blocking plate 150 may be supported swingably in the front-rear direction by the upper cover 122.

Although each of the guide air passages 140 is formed in a net-like form allowing passage of air in the present embodiment, the disclosure is not limited to this configuration. Each of the guide air passages 140 may be formed of a material which does not allow passage of air such as metal.

Although the rear part of the communication air passage 122c is divided into two parts, specifically, the right and left parts in the present embodiment, the disclosure is not limited to this configuration. The rear part of the communication air passage 122c may not be divided or may be divided into three or more parts.

What is claimed is:

1. A grass collector comprising:
a grass collector body comprising:
a storage body defining a storage space for storing grass clippings formed inside the grass collector body;
at least a part of a side face of the grass collector body being formed in a net-like form comprising a mesh allowing passage of air; and
a communication air passage having a front end rearwardly spaced from a front side of the storage body;
the communication air passage comprising:
an open first end positioned in a rear part of the storage space of the storage body to allow the storage space and an outside to communicate with each other; and
an open second end downstream of the open first end, the open second end being in communication with the outside;
the communication air passage being delimited by at least one air-guiding surface extending continuously from the open first end to the open second end;
a dustproof net comprising a mesh provided in the communication air passage;
a duct extending rearwardly to an inlet of a forward-facing surface of a front part of the grass collector body to thereby direct grass clippings through a first end of the duct into the grass collector body beneath the dustproof net;
a blocking plate disposed inside the storage space with a blocking surface facing the first end of the duct and entirely spaced rearwardly from the front side of the storage body; and
a front end of the net being rearward of the first end of the duct.

2. The grass collector as claimed in claim 1, wherein:
the mesh of the dustproof net comprises holes larger than mesh of at least the part of the side face of the grass collector body.

3. The grass collector as claimed in claim 1, wherein the dustproof net is provided on the first end of the communication air passage.

4. The grass collector as claimed in claim 1, wherein:
the first end of the communication air passage is open downward, and
the dustproof net covers the first end of the communication air passage.

5. The grass collector as claimed in claim 1, further comprising a guide air passage having a first end connected to the second end of the communication air passage and a second end open to the outside at a position lower than the second end of the communication air passage.

6. The grass collector as claimed in claim 5, wherein the second end of the guide air passage is disposed near a bottom part of the grass collector body.

7. The grass collector as claimed in claim 5, wherein the second end of the guide air passage is open downward.

8. The grass collector as claimed in claim 5, wherein the guide air passage is formed in a net-like form comprising a mesh allowing passage of air.

9. The grass collector as claimed in claim 5, wherein the guide air passage extends in an up-down direction along a rear side face of the grass collector body.

10. The grass collector as claimed in claim 9, wherein
the rear side face of the grass collector body and the guide air passage are formed in a net-like form comprising mesh allowing passage of air, and
holes of the mesh of the dustproof net is larger than holes of the mesh of the rear side face of the grass collector body and holes of the mesh of the guide air passage.

11. The grass collector as claimed in claim 1, wherein the first end of the communication air passage is disposed above the rear part of the storage space and the second end of the communication air passage is disposed on the rear side with respect to the storage space.

12. The grass collector as claimed in claim 1, further comprising a guide air passage extending in an up-down direction along a rear side face of the grass collector body, the guide air passage having a first end connected to the second end of the communication air passage and a second end disposed near a bottom part of the grass collector body, the second end of the guide air passage being open downward.

13. The grass collector as claimed in claim 1, wherein the second end of the communication air passage is divided into a plurality of parts.

14. The grass collector as claimed in claim 1, wherein the blocking plate is disposed on the front side with respect to the first end of the communication air passage.

15. The grass collector as claimed in claim 1, wherein an upper part of the blocking plate is coupled to an upper face of the grass collector body and a lower part of the blocking plate extends downward.

16. The grass collector as claimed in claim 1, wherein the blocking plate is swingable in a front-rear direction.

17. The grass collector as claimed in claim 1, wherein the blocking plate has flexibility.

18. The grass collector as claimed in claim 1, wherein the blocking plate is formed in a curved shape.

19. The grass collector as claimed in claim 1, wherein a right-left width of the blocking plate is larger than a right-left width of the first end of the duct.

20. The grass collector as claimed in claim 1, wherein an upper part of the blocking plate extends downwardly, and is suspended from, a top cover of the grass collector body.

21. The grass collector as claimed in claim 1 in combination with a grass-cutting mower, wherein a front end of the duct of the grass collector is connected to communicate with the a rear part of the mower, and wherein the grass-cutting mower is configured to generate carrier air to convey grass clippings from the mower through the duct and into the grass collector body.

* * * * *